UNITED STATES PATENT OFFICE.

CHARLES W. MERRILL, OF ALAMEDA, CALIFORNIA.

REFINING HYDROMETALLURGICAL PRODUCTS CONTAINING PRECIOUS METALS.

No. 815,851.   Specification of Letters Patent.   Patented March 20, 1906.

Application filed February 2, 1903. Serial No. 141,590.

*To all whom it may concern:*

Be it known that I, CHARLES W. MERRILL, a citizen of the United States, residing at Alameda, county of Alameda, State of California, have invented an Improvement in the Art of Refining Hydrometallurgical Products Containing Precious Metals; and I hereby declare the following to be a full, clear, and exact description of the same.

In refining finely-divided hydrometallurgical products—such as precipitates from cyanid, chlorin, or hyposulfite solutions or electrolytic deposits or residuum—by the ordinary method of crucible-refining difficulties have been encountered and losses incurred on account, first, of the fine state of division, often in the form of a fine dust; second, of the volatile constituents often contained, as zinc and arsenic; third, of the absence, as a rule, of a suitable collecting metal, as lead or copper, and, fourth, on account of the absence of a suitable binding or adhesive agent to prevent dust loss. In my process I overcome these difficulties and losses in the manner which I will hereinafter describe and claim.

Where a solution of a soluble lead salt is mixed with the powdered material prior to fusing, the effect is to envelop each individual dust particle in a lead casing during fusion. The result is that each precious particle is carried downward through the slag into the lead-bath.

I may briquet one or the other of the foregoing mixtures or add thereto an adhesive agent, as molasses or lime, as a binder, or I may do both. In other words, I may under some conditions add to the finely-divided material litharge a flux, a solution of a soluble lead salt, and an adhesive agent and then briquet the entire mixture.

The object of briqueting, binding with an adhesive agent, and enveloping with a soluble lead salt is for the purpose of so uniting the naturally finely divided material into a coherent mass that during the introduction of the material to the cupel, crucible, or other container and during cupellation loss will not result, as occurs under ordinary methods, by the finely-divided material being carried off in the form of dry dust. This loss from "dusting" under ordinary methods of refining such products amounts to from five to ten per cent.—a serious matter in practical refining on a large scale.

Having mixed and bound the material, I then fuse it in a cupel or crucible, reduce the litharge to metallic lead, adding fresh material periodically. The lead collects and contains the finely-divided precious metals and is then cupelled off and recovered as litharge to be used in subsequent operations. Thus the precious metals are obtained nearly pure and may be cast or remelted into bars.

The primary object of this invention is to prevent dust loss, as mentioned, and, secondly, it is for the purpose of reducing the amount of the values held over in the by-products. By ordinary processes of recovery the slag often contains values to the extent of thousands of dollars per ton. With my process the by-products are of very low value, for the reason that the lead is constantly percolating downward through the slag and carrying the values with it. To this end, it is preferred that all the mixed material should not be admitted at one charge into the cupel, but that in reducing any given quantity portions of the bonded mixture should be added from time to time to the mass in the cupel, so that the accumulating layer of slag will be subjected to successive impregnations of lead which will carry down values that would otherwise be held up by the slag.

The smelting steps of this process are conducted in a single furnace—*i. e.*, a cupel-furnace—the slag being drawn off until only the lead-bath remains, and cupellation is then proceeded with, the residuum of precious metals being practically pure.

Having thus described my invention, what I claim, and desire to secure by Letters Patent, is—

The improvement in refining finely-divided hydrometallurgical products which consists in mixing the material with litharge, adding to said material or the mixture a soluble lead salt, reducing the litharge and soluble lead salt to metallic lead by heat, replenishing the material periodically to provide fresh accretions of lead, and finally cupeling the lead off from the precious metals.

In witness whereof I have hereunto set my hand.

CHARLES W. MERRILL.

Witnesses:
S. H. NOURSE,
JESSIE C. BRODIE.